(12) United States Patent
Zhang et al.

(10) Patent No.: US 12,028,153 B2
(45) Date of Patent: Jul. 2, 2024

(54) WAVELENGTH SWITCHING AND CONFIGURATION METHOD AND DEVICE FOR PASSIVE OPTICAL NETWORK

(71) Applicant: ZTE Corporation, Shenzhen (CN)

(72) Inventors: Weiliang Zhang, Shenzhen (CN); Mingsheng Li, Shenzhen (CN); Bo Yang, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 104 days.

(21) Appl. No.: 17/620,216

(22) PCT Filed: Jun. 4, 2020

(86) PCT No.: PCT/CN2020/094261
§ 371 (c)(1),
(2) Date: Dec. 17, 2021

(87) PCT Pub. No.: WO2020/253540
PCT Pub. Date: Dec. 24, 2020

(65) Prior Publication Data
US 2022/0271858 A1   Aug. 25, 2022

(30) Foreign Application Priority Data
Jun. 17, 2019   (CN) .......................... 201910523626.3

(51) Int. Cl.
*H04Q 11/00*   (2006.01)
*H04J 14/02*   (2006.01)

(52) U.S. Cl.
CPC ........ *H04J 14/025* (2013.01); *H04J 14/0208* (2013.01); *H04J 14/0282* (2013.01);
(Continued)

(58) Field of Classification Search
CPC .......................... H04Q 11/0067; H04J 14/025
See application file for complete search history.

(56) References Cited

U.S. PATENT DOCUMENTS

| | | | | |
|---|---|---|---|---|
| 8,208,815 B1* | 6/2012 | Chiang | ............. | H04Q 11/0067 |
| | | | | 398/155 |
| 2004/0146301 A1* | 7/2004 | Choi | ................. | H04Q 11/0067 |
| | | | | 398/58 |

(Continued)

FOREIGN PATENT DOCUMENTS

| | | |
|---|---|---|
| CN | 101394229 A | 3/2009 |
| CN | 103840903 A | 6/2014 |

(Continued)

OTHER PUBLICATIONS

International Search Report for corresponding application PCT/CN2020/094261 filed Jun. 4, 2020; Mail date Jul. 29, 2020.
(Continued)

*Primary Examiner* — Shi K Li
(74) *Attorney, Agent, or Firm* — CANTOR COLBURN LLP

(57) ABSTRACT

Provided are wavelength switching and configuration methods and devices for a Passive Optical Network (PON). The switching method includes the following operations. An Optical Network Unit (ONU) responds to a ranging request message sent by an Optical Line Terminal (OLT) on a first uplink wavelength supported by the ONU. The ONU receives ranging information sent by the OLT. The ONU uses the received ranging information as ranging information about a second uplink wavelength of the ONU, and performs data transmission on the second uplink wavelength according to a bandwidth allocation from the OLT. A path transmission time difference caused by a wavelength interval between the first uplink wavelength and the second uplink wavelength is less than a corresponding fault toler- (Continued)

ance range when the OLT receives data. The ranging information is obtained by the OLT according to a ranging response sent by the ONU on the first uplink wavelength.

16 Claims, 5 Drawing Sheets

(52) U.S. Cl.
CPC . *H04Q 11/0067* (2013.01); *H04Q 2011/0075* (2013.01); *H04Q 2011/0086* (2013.01)

(56) References Cited

U.S. PATENT DOCUMENTS

| | | | | |
|---|---|---|---|---|
| 2009/0080891 | A1* | 3/2009 | Kazawa | H04J 3/0682 398/79 |
| 2015/0023664 | A1* | 1/2015 | Mukai | H04J 14/0257 398/58 |
| 2015/0207585 | A1* | 7/2015 | Luo | H04J 14/0256 398/72 |
| 2017/0207876 | A1 | 7/2017 | Gao | |
| 2020/0213027 | A1* | 7/2020 | Guan | H04J 14/0267 |

FOREIGN PATENT DOCUMENTS

| | | |
|---|---|---|
| CN | 103841474 A | 6/2014 |
| CN | 107395315 A | 11/2017 |
| CN | 108633325 A | 10/2018 |
| EP | 3537628 A1 | 9/2019 |
| WO | 2010064981 A1 | 6/2010 |
| WO | 2014122525 A1 | 8/2014 |
| WO | 2017197978 A1 | 11/2017 |
| WO | 2018094606 A1 | 5/2018 |
| WO | 2019052515 A1 | 3/2019 |

OTHER PUBLICATIONS

European Search Report for corresponding application 20826461.4; Mail date Jul. 19, 2022.
Huawei Technologies, "Draft document of G. multi", Nov. 2011, International Telecommunication Union.

* cited by examiner

WAVELENGTH SWITCHING AND CONFIGURATION METHOD AND DEVICE FOR PASSIVE OPTICAL NETWORK

CROSS-REFERENCE TO RELATED APPLICATION

The present disclosure claims priority to Chinese Patent Application No. 201910523626.3, filed to the China National Intellectual Property Administration on Jun. 17, 2019, the disclosure of which is hereby incorporated by reference in its entirety.

TECHNICAL FIELD

The present disclosure relates, but is not limited, to the field of communications.

BACKGROUND

FIG. 1 is a schematic diagram of a conventional network architecture of a Passive Optical Network (PON) in the related art. As shown in FIG. 1, a channel between an Optical Line Terminal (OLT) and an Optical Network Unit (ONU) transmits both data and management information, i.e. an OLT and an ONU communicate through a channel. With the development of a mobile network, a PON has gradually become one of bearer technologies of mobile fronthaul, mobile backhaul, sensor networks, and in-vehicle networks. A transmission delay of the mobile network or even the PON as a bearer is strictly required by these network services in an application process.

The transmission delay in the PON includes: an optical transmission delay, a delay caused by opening a quiet window, a bandwidth allocation delay, etc. The optical transmission delay is related to a fiber distance, and a transmission time of 20 KM is about 100 us. The quiet window is opened for the OLT to discover and range the ONU, which belongs to overheads brought by channel connection initialization between the OLT and the ONU. In order to find an ONU located at a maximum of 20 KM from the OLT, it is necessary to open a quiet window of 200 microseconds, during which the ONU normally operating cannot communicate with the OLT in general. On the other hand, in order to realize rapid discovery of the ONU, the OLT needs to periodically open a quiet window to discover the ONU, and the period is relevant to practical applications. If the ONU is expected to be registered at the level of seconds, the period should be at the level of seconds, that is, a quiet window of up to 200 microseconds must be opened in every 1 second. Since the quiet window is used for an ONU to be activated by registration to send an uplink signal and another ONU which has been activated by registration and works normally cannot send an uplink signal at the quiet window, if the ONU working normally has uplink data to be sent right at the beginning of the quiet window, it is necessary to wait for the end of the quiet window before the uplink data can be sent. In this case, the uplink data sent by the ONU working normally will likely cause a delay of up to 200 microseconds. In the related art, when the OLT ranges the ONU, a quiet window also needs to be opened. However, in fact, when the OLT discovers the ONU, the distance between the OLT and the ONU may be estimated, that is, an arrival time of a ranging response of the OLT to the ONU may be estimated. In addition, the quiet window used for ranging is dedicated to an ONU to be ranged. There is no need for multiple ONUs to compete. Therefore, the quiet window opened for ranging may be smaller than the quiet window opened for ONU discovery, and the delay brought to the ONU working normally is also smaller.

The adoption of a third wavelength mode to achieve quiet window opening is also discussed in the current standard organization, but there are several problems as follows: if a wavelength is added as a third wavelength in an original system, the definition of the third wavelength is very difficult, and wavelength resources are very strained; one of the wavelengths in an original system is used, such as a Time Wavelength Division Multiplexing Passive Optical Network (TWDM-PON) system, but the low delay capacity of the original system is reduced. Therefore, in the related art, it is difficult to reduce a transmission delay of a service PON system capable of bearing mobile fronthaul, mobile backhaul, sensor networks, and in-vehicle networks with a high delay requirement, and there is no good solution.

SUMMARY

According to an embodiment of the present disclosure, a wavelength switching method for a PON is provided. The method may include the following operations. An ONU responds to a ranging request message sent by an OLT on a first uplink wavelength supported by the ONU. The ONU receives ranging information sent by the OLT. The ONU uses the received ranging information as ranging information about a second uplink wavelength of the ONU, and performs data transmission on the second uplink wavelength according to a bandwidth allocation from the OLT. A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

According to an embodiment of the present disclosure, a wavelength configuration method for a PON is provided. The method may include the following operations. An OLT sends a ranging request message to an ONU on a downlink wavelength, and receives a ranging response message on a first uplink wavelength supported by the ONU. The OLT completes ranging of the downlink wavelength and the first uplink wavelength according to the ranging response message, and sends ranging information to the ONU on the downlink wavelength. The ranging information is used for instructing the ONU to switch a sending wavelength to a second uplink wavelength supported by the ONU. The OLT performs data transmission with the ONU on the second uplink wavelength. A path transmission time difference caused by a wavelength interval between the first uplink wavelength and the second uplink wavelength is less than a corresponding fault tolerance range when the OLT receives data.

According to another embodiment of the present disclosure, a wavelength switching device for a PON is provided. The device may be located on an ONU and may include: a response module, configured to respond to a ranging request message sent by an OLT on a first uplink wavelength supported by the ONU; a receiving module, configured to receive ranging information sent by the OLT; and a switching module, configured to use the received ranging information as ranging information about a second uplink wavelength of the ONU, and perform data transmission on the second uplink wavelength according to a bandwidth allocation from the OLT. A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

According to another embodiment of the present disclosure, a wavelength configuration device for a PON is provided. The device may be located in an OLT and may include: an interaction module, configured to send a ranging request message to an ONU on a downlink wavelength, and receiving a ranging response message on a first uplink wavelength supported by the ONU; a configuration module, configured to complete ranging of the downlink wavelength and the first uplink wavelength according to the ranging response message, and send ranging information to the ONU on the downlink wavelength, the ranging information being used for instructing the ONU to switch a sending wavelength to a second uplink wavelength supported by the ONU; and a data transmission module, configured to perform data transmission with the ONU on the second uplink wavelength. A path transmission time difference caused by a wavelength interval between the first uplink wavelength and the second uplink wavelength is less than a corresponding fault tolerance range when the OLT receives data.

According to another embodiment of the present disclosure, a storage medium is also provided. The storage medium may store a computer program. The computer program may be configured to perform, when executed, the steps in any one of the above method embodiments.

According to yet another embodiment of the present disclosure, an electronic device is also provided, which may include a memory and a processor. The memory may store a computer program. The processor may be configured to execute the computer program to perform the steps in any one of the above method embodiments.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION OF THE EMBODIMENTS

Figure 1:
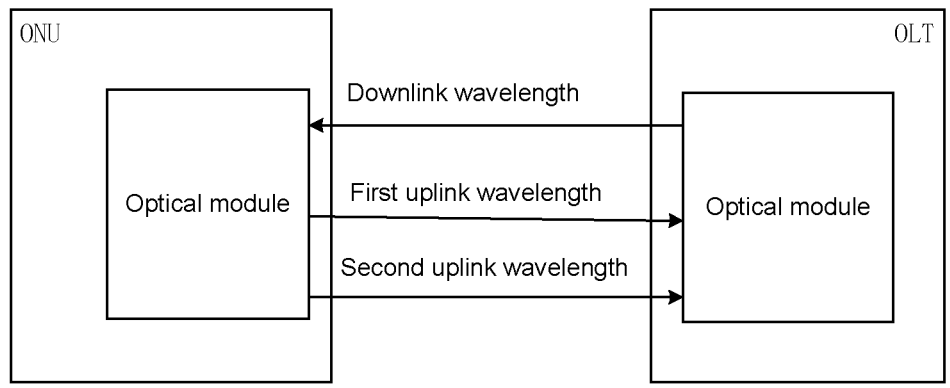
FIG. 1 is a schematic diagram of a conventional network architecture of a PON in the related art.

The present disclosure is described below with reference to the drawings and in conjunction with the embodiments in detail. It should be noted that embodiments in the present application and characteristics in the embodiments may be combined under the condition of no conflicts.

It is to be noted that the specification and claims of the disclosure and the terms "first", "second" and the like in the drawings are used to distinguish similar objects, and do not need to describe a specific sequence or a precedence order.

Figure 2:
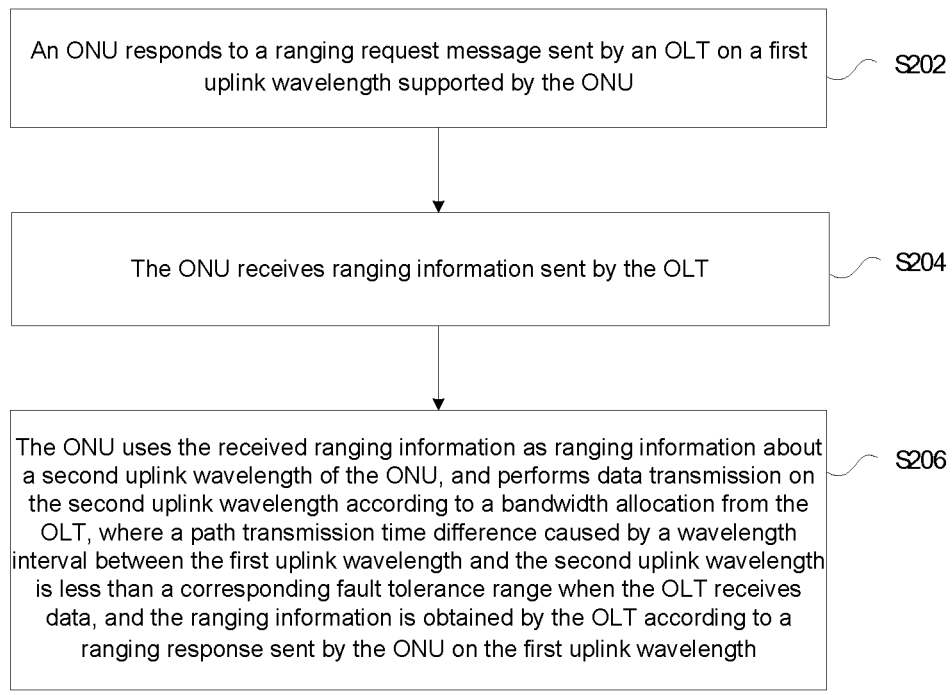
FIG. 2 is a flowchart of a wavelength switching method for a PON according to an embodiment of the present disclosure.

In an aspect, the present disclosure provides a wavelength switching method for a PON. FIG. 2 is a flowchart of a wavelength switching method for a PON according to an embodiment of the present disclosure. As shown in FIG. 2, in some embodiments, the method may include the following steps: S202, S204 and S206.

In step S202, an ONU responds to a ranging request message sent by an OLT on a first uplink wavelength supported by the ONU.

In step S204, the ONU receives ranging information sent by the OLT.

In step S206, the ONU uses the received ranging information as ranging information about a second uplink wavelength of the ONU, and performs data transmission on the second uplink wavelength according to a bandwidth allocation from the OLT.

A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

Here, it will be understood that a difference between the first uplink wavelength and the second uplink wavelength causes a difference in transmission time of an uplink optical signal, and the resulting transmission time difference (path transmission time difference) should be less than a corresponding fault tolerance range when the OLT receives data.

In an embodiment, the step that the ONU switches a sending wavelength to a second uplink wavelength supported by the ONU according to the ranging information includes the following operation. The ONU tunes or switches the sending wavelength from the first uplink wavelength to the second uplink wavelength.

For example, after ranging, when an optical module of the ONU supports a tunable function, a sending wavelength is tuned from the first uplink wavelength to the second uplink wavelength to perform service interaction with the OLT. Meanwhile, the ONU may also switch the sending wavelength from the first uplink wavelength to the second uplink wavelength, or directly open the second uplink wavelength.

In an embodiment, after the ONU receives a bandwidth allocation from the OLT, the method further includes the following operation. When the ONU self-determines to save energy or receives recovery ranging information sent by the OLT, the ONU tunes or switches a current sending wavelength from the second uplink wavelength to the first uplink wavelength. The recovery ranging information is used for instructing the ONU to configure the sending wavelength as the first uplink wavelength.

In an embodiment, the ranging information includes at least one of the following information: an equivalent delay, or a difference between an equivalent delay and a line transmission delay.

In an embodiment, the second uplink wavelength is used for bearing a service having a delay smaller than a preset delay threshold.

In an embodiment, the fault tolerance range is related to an uplink transmission rate between the ONU and the OLT. In order to ensure that uplink data of each ONU does not collide at different rates, considering that the time when optical signals at different rates do not collide is substantially the same, the time when optical signals at different rates do not collide is converted into corresponding different bit data lengths. For example, at a rate of 10 Gbit/s, the fault tolerance range is the time when a data length is 32 bits. At a rate of 25 Gbit/s, the fault tolerance range is the time when a data length is 80 bits. At a rate of 50 Gbit/s, the fault tolerance range is the fault tolerance range is the time when a data length is 160 bits.

At a rate of 25 Gbit/s, a wavelength interval between the first uplink wavelength and the second uplink wavelength of less than 15 nm may achieve a transmission delay difference of 20 km which is less than the fault tolerance range where the OLT can receive data. Accordingly, wavelength ranges of the first uplink wavelength and the second uplink wavelength may be planned and determined. For example, the first uplink wavelength and the second uplink wavelength may be within a wavelength range of 1290-1310 nm, where 1290-1295 nm is the wavelength range of the first uplink wavelength, and 1305-1310 nm is the wavelength range of the second uplink wavelength. For example, 1260-1280 nm is divided into two sub-bands: 1260-1265 nm and 1275-1280 nm, where 1260-1265 nm is the wavelength range of the first uplink wavelength, and 1275-1280 nm is the wavelength range of the second uplink wavelength. The first uplink wavelength is used for quiet window opening and ONU registration, and is a registration sub-wavelength. The second uplink wavelength is used for bearing a low-delay service, and is a service sub-wavelength.

The first uplink wavelength and the second uplink wavelength may also have the same central wavelength, but different polarizations are used, or different sub-carriers of the same central wavelength are used as the first uplink wavelength and the second uplink wavelength, and a sub-carrier interval may be 100 Ghz.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

Figure 3:
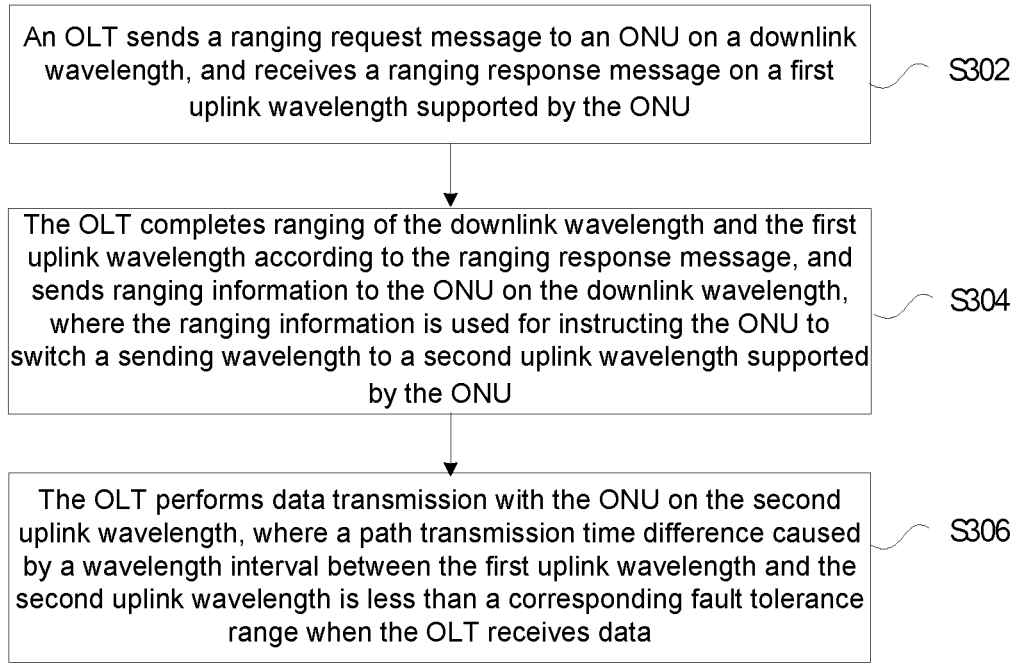
FIG. 3 is a flowchart of a wavelength configuration method for a PON according to an embodiment of the present disclosure.

In another aspect, the present disclosure provides a wavelength configuration method for a PON. FIG. 3 is a flowchart of a wavelength configuration method for a PON according to an embodiment of the present disclosure. As shown in FIG. 3, in some embodiments, the method may include the following steps: S302, S304 and S306.

In step S302, an OLT sends a ranging request message to an ONU on a downlink wavelength, and receives a ranging response message on a first uplink wavelength supported by the ONU.

In step S304, the OLT completes ranging of the downlink wavelength and the first uplink wavelength according to the ranging response message, and sends ranging information to the ONU on the downlink wavelength. The ranging information is used for instructing the ONU to switch a sending wavelength to a second uplink wavelength supported by the ONU.

In step S306, the OLT performs data transmission with the ONU on the second uplink wavelength.

A path transmission time difference caused by a wavelength interval between the first uplink wavelength and the second uplink wavelength is less than a corresponding fault tolerance range when the OLT receives data.

Here, it will be understood that a difference between the first uplink wavelength and the second uplink wavelength causes a difference in transmission time of an uplink optical signal, and the resulting transmission time difference (path transmission time difference) should be less than a corresponding fault tolerance range when the OLT receives data.

In an embodiment, the ranging information includes at least one of the following information: an equivalent delay, or a difference between an equivalent delay and a line transmission delay.

In an embodiment, the second uplink wavelength is used for bearing a service having a delay smaller than a preset delay threshold.

In an embodiment, the fault tolerance range is related to an uplink transmission rate between the ONU and the OLT.

In another aspect, the present disclosure also provides a wavelength switching device for a PON, which is located on an ONU. The device is configured to implement the above embodiments and exemplary implementation manners, and the description thereof has been omitted. As used below, the term "module" may implement a combination of software and/or hardware of a predetermined function. Although the device described in the following embodiments may be implemented by software, hardware or a combination of software and hardware is also possible and conceived.

Figure 4:
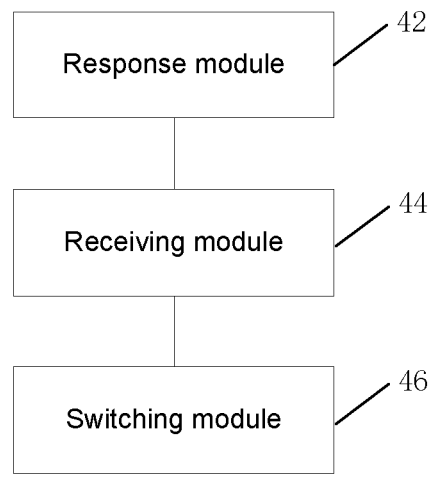
FIG. 4 is a structural block diagram of a wavelength switching device for a PON according to an embodiment of the present disclosure.

FIG. 4 is a structural block diagram of a wavelength switching device for a PON according to an embodiment of the present disclosure. As shown in FIG. 4, in some embodiments, the device may include: a response module 42, configured to respond to a ranging request message sent by an OLT on a first uplink wavelength supported by the ONU; a receiving module 44, configured to receive ranging information sent by the OLT; and a switching module 46, configured to use the received ranging information as ranging information about a second uplink wavelength of the ONU, and perform data transmission on the second uplink wavelength according to a bandwidth allocation from the OLT.

A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

Here, it will be understood that a difference between the first uplink wavelength and the second uplink wavelength causes a difference in transmission time of an uplink optical signal, and the resulting transmission time difference (path transmission time difference) should be less than a corresponding fault tolerance range when the OLT receives data.

It is to be noted that each of the above modules may be implemented by software or hardware. The latter may be implemented by, but not limited to, the following manners: the above modules are all located in the same processor; or, the above modules are located in different processors respectively in any combined form.

In another aspect, the present disclosure also provides a wavelength configuration device for a PON, which is located on an OLT. The device is configured to implement the above embodiments and exemplary implementation manners, and the description thereof has been omitted. As used below, the term "module" may implement a combination of software and/or hardware of a predetermined function. Although the device described in the following embodiments may be implemented by software, hardware or a combination of software and hardware is also possible and conceived.

Figure 5:
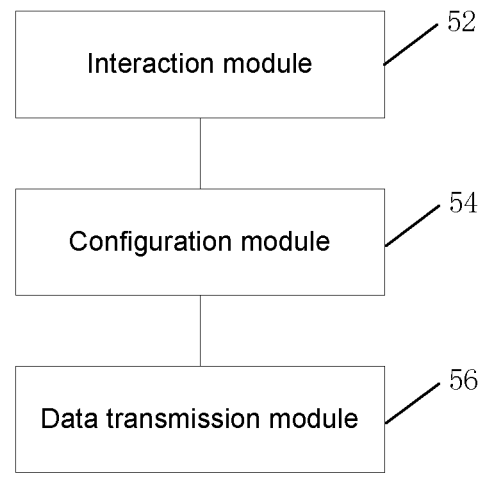
FIG. 5 is a structural block diagram of a wavelength configuration device for a PON according to an embodiment of the present disclosure.

FIG. 5 is a structural block diagram of a wavelength configuration device for a PON according to an embodiment of the present disclosure. As shown in FIG. 5, in some embodiments, the device may include: an interaction module 52, configured to send a ranging request message to an ONU on a downlink wavelength, and receiving a ranging response message on a first uplink wavelength supported by the ONU; a configuration module 54, configured to complete ranging of the downlink wavelength and the first uplink wavelength according to the ranging response message, and send ranging information to the ONU on the downlink wavelength, the ranging information being used for instructing the ONU to switch a sending wavelength to a second uplink wavelength supported by the ONU; and a data transmission module 56, configured to perform data transmission with the OLT on the second uplink wavelength. A path transmission time difference caused by a wavelength interval between the first uplink wavelength and the second uplink wavelength is less than a corresponding fault tolerance range when the OLT receives data.

Here, it will be understood that a difference between the first uplink wavelength and the second uplink wavelength causes a difference in transmission time of an uplink optical signal, and the resulting transmission time difference (path transmission time difference) should be less than a corresponding fault tolerance range when the OLT receives data.

It is to be noted that each of the above modules may be implemented by software or hardware. The latter may be implemented by, but not limited to, the following manners: the above modules are all located in the same processor; or, the above modules are located in different processors respectively in any combined form.

In order to better understand the above solution, the following optical path structure is also provided for understanding according to the above embodiment.

Figure 6:
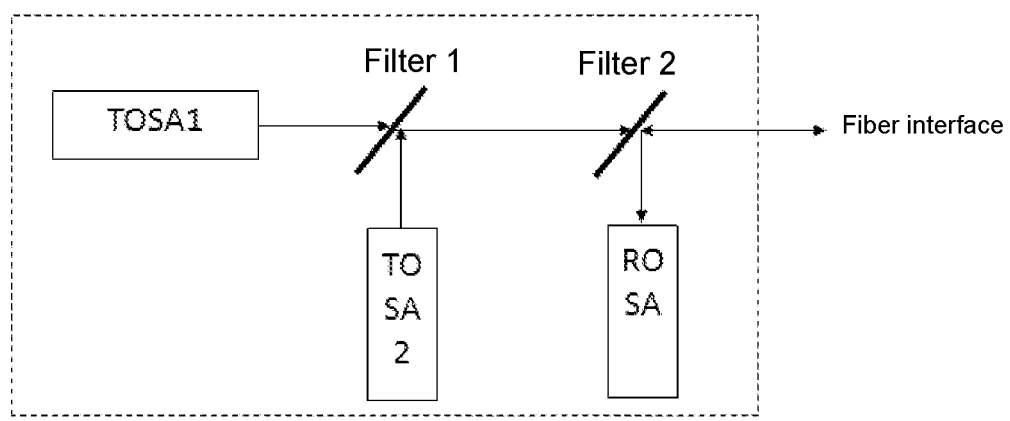
FIG. 6 is an optical path structure diagram of an ONU optical module according to an embodiment of the present disclosure.

Structure 1:

It is assumed that an uplink wavelength range is 1260-1280 nm. FIG. 6 is an optical path structure diagram of an ONU optical module according to an embodiment of the present disclosure. As shown in FIG. 6, the optical module includes an optical transmission assembly 1 (TOSA1) for normal service data communication, an optical transmission assembly 2 (TOSA2) for ONU registration, and an optical receiving assembly (ROSA) for normal receiving. The emitted light wavelength range of TOSA1 is a band range (1260-1265 nm) of the above first uplink wavelength, which may be implemented based on devices such as an Electro-absorption Modulated Laser (EML), a Directly Modulated Laser (DML) and a tunable laser. In order to ensure that the emitted light wavelength of TOSA1 is within the wavelength band of the registration sub-wavelength within the whole working temperature range, TOSA1 also includes a temperature control device or a wavelength locking device, etc. The emitted light wavelength range of TOSA2 is a band range (1275-1280 nm) of the second uplink wavelength, which may be implemented based on devices such as an EML, a DML and a tunable laser. In order to ensure that the emitted light wavelength of TOSA2 is within the wavelength band of the service sub-wavelength within the whole working temperature range, TOSA2 also includes a temperature control device or a wavelength locking device, etc.

Further, the ONU optical module further includes a filter 1 and a filter 2 for wave combination and separation of TOSA1, TOSA2 and ROSA, so as to realize optical path single-fiber output of the optical module. The filter 1 realizes low-loss wave combination and separation of TOSA1 and TOSA2, specifically including: transmitting the second uplink wavelength and reflecting the first uplink wavelength. In order to reduce the loss of wave combination and separation, a transmission spectrum and a reflection spectrum thereof need to satisfy the condition of minimal crosstalk in the service sub-wavelength band and the registration sub-wavelength band. The filter 2 realizes low-loss wave combination and separation of the combined transmitting end second uplink wavelength and first uplink wavelength and a received working wavelength optical signal of ROSA. Further, the filter 1 may also be replaced by a half-reflecting and half-transmitting mirror, provided that the emitted light optical power of an ONU transmitter meets the system requirements.

In an embodiment, the ONU optical module further includes a control module which opens, closes or switches TOSA1 and TOSA2 at different stages of the ONU registration process according to control instructions sent by the ONU device. The ONU optical module further includes modules such as a controller, a driver, a Trans-Impedance Amplifier (TIA), etc. a general electrical processing chip and a communication interface, so as to realize the normal working of the optical module and information interaction between the optical module and a device.

Figure 7:
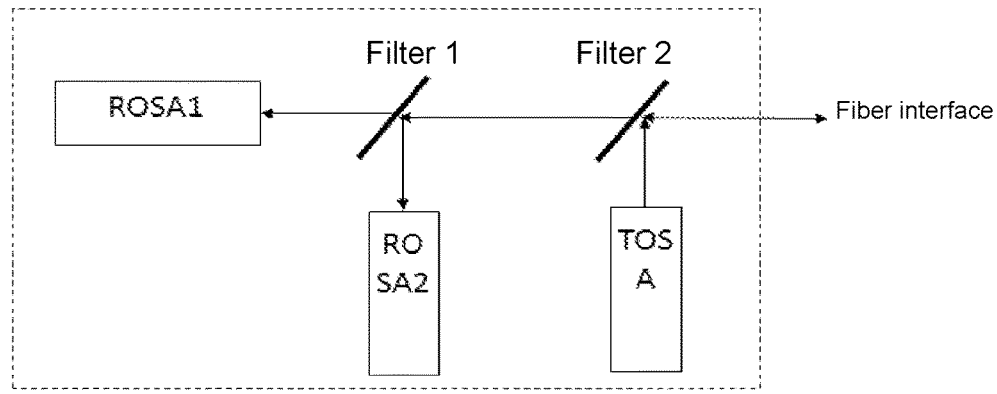
FIG. 7 is an optical path structure diagram of an OLT optical module according to an embodiment of the present disclosure.

FIG. 7 is an optical path structure diagram of an OLT optical module according to an embodiment of the present disclosure. As shown in FIG. 7, the optical module includes an optical transmission assembly TOSA for normal service and data communication control, an optical receiving assembly 1 (ROSA1) for the second uplink wavelength, and an optical receiving assembly 2 (ROSA2) for receiving the first uplink wavelength of the ONU. ROSA1 and ROSA2 may be realized using photoelectric detection devices such as an Avalanche Photo Diode (APD) and a Positive-Intrinsic-Negative (PIN). ROSA1 only receives the second uplink wavelength (1275-1280 nm), and ROSA2 only receives the first uplink wavelength (1260-1265 nm). ROSA1 used for normal service communication receives a service sub-wavelength band wavelength emitted by the ONU via a transmission end of the filter 1, and ROSA2 used for ONU registration receives a registration sub-wavelength band wavelength emitted by the ONU via a reflection end of the filter 1. The filter 1 of the OLT optical module satisfies the following conditions: the filter 1 has a low-loss transmission for the second uplink wavelength and a low-loss reflection for the first uplink wavelength, and a transmission spectrum and a reflection spectrum thereof need to satisfy the condition of minimal crosstalk in the service sub-wavelength band and the registration sub-wavelength band.

In an embodiment, the OLT optical module further includes a filter 2 for wave combination and separation of TOSA, ROSA1 and ROSA2, so as to realize optical path single-fiber output of the optical module. The filter 2 realizes low-loss wave combination and separation of the second uplink wavelength and first uplink wavelength received by the OLT and a working wavelength optical signal emitted thereby.

In an embodiment, the OLT optical module further includes a control module which opens or closes ROSA2 at different stages of the registration process according to control instructions sent by the OLT device. The OLT optical module further includes modules such as a controller, a driver, a TIA, etc. a general electrical processing chip and a communication interface, so as to realize the normal working of the optical module and information interaction between the optical module and a device.

It should be noted that the above sub-band division is only an embodiment of the present disclosure, and that the sub-band division range may actually be adjusted based on transmitter cost, filter isolation band size, and available wavelength resources.

Structure 2:

In structure 1, an uplink band is re-divided into sub-bands, and the ONU transmitting end requires two wavelength transmitters, or a tunable transmitter is added for tuning, which increases the cost of an ONU-side optical module to a certain extent. The first uplink wavelength and the second uplink wavelength in the present solution are divided according to polarization states, and the wavelength ranges are the same, respectively corresponding to a registration sub-wavelength and a service sub-wavelength. For example, ONU transmitting end TE polarized light sends normal service communication information as the second uplink wavelength, and TM polarized light sends registration information as the first uplink wavelength. At a receiving side of the OLT, after polarization demultiplexing and receiving, a TE polarized light signal is a received normal communication signal, and a TM polarized light signal is a received registration signal. In the present solution, the OLT receiving may adopt direct detection polarization demultiplexing receiving or coherent detection demultiplexing receiving, and the polarization demultiplexing receiving can be realized by a polarization diversity PD detection and a digital signal processing algorithm according to system bandwidth and optical power budget requirements, which will not be described in detail.

In the implementation of the above solution, an optical path implementation of an optical transmission assembly of an ONU-side optical module includes a TE polarization state laser, a controllable polarization rotator, and a coupling optical path, etc. The TE polarization state laser may be a DML, an EML, a DBR laser, etc. which may load normal service data, and output TE polarized light to a controllable polarization rotator. The controllable polarization rotator controls the polarization state of output light to be a TE or TM polarization state according to different stages of the ONU registration process. This is a preferred embodiment for realizing polarization state wavelength division. Specifically, the ONU may also realize the output of double-polarized light through 45-degree linear polarization and polarization beam splitting and combining: polarization loading of normal service data, and loading of registration interaction information.

Figure 8:
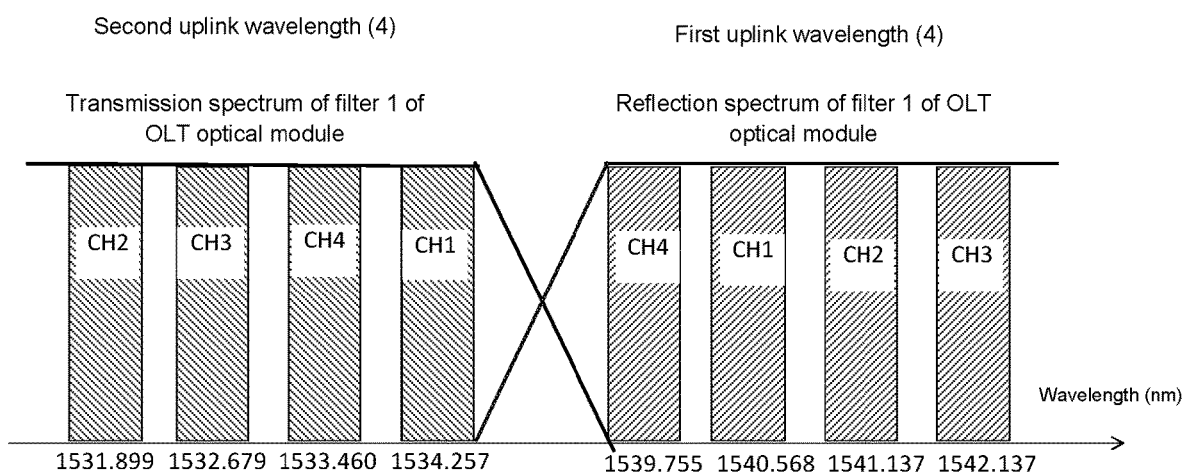
FIG. 8 is a schematic diagram of dividing a first uplink wavelength and a second uplink wavelength according to an embodiment of the present disclosure.

Structure 3:

In an uplink wavelength planning of a TWDM-PON system defined by G.989.2, Wide band option 1524-1544 nm, Reduced band option is 1528-1540 nm and Narrow band option is 1532-1540 nm. For a 4-wave TWDM-PON system, all the above 3 options have a large wavelength redundancy, and a redundant waveband may be used as a first uplink wavelength (a registration sub-wavelength) without occupying 4 wavelength resources which work normally. Narrow band option (1532-1540 nm) is taken as an example. FIG. 8 is a schematic diagram of dividing a first uplink wavelength and a second uplink wavelength according to an embodiment of the present disclosure. As shown in FIG. 8, the second uplink wavelength band works at 1531-1534 nm and the first uplink wavelength band works at 1539-1542 nm. Each sub-band includes 4 wavelengths spaced apart about 100 GHz, and 4 wavelength grid points of the second uplink wavelength band are 1531.899 nm, 1532.679 nm, 1533.460 nm and 1534.257 nm. The 4 wavelength grid points of the first uplink wavelength band are 1539.755 nm, 1540.568 nm, 1541.137 nm and 1542.137 nm, respectively corresponding to the 4 wavelengths of the second uplink wavelength band. With a periodic Arrayed Waveguide Grating (AWG) device, CH1 in the service sub-wavelength band and CH1 in the registration sub-wavelength band are output from the same port of AWG, . . . , CH4 in the service sub-wavelength band and CH4 in the registration sub-wavelength band are output from the same port of AWG. The periodic AWG is used for the OLT side to perform wave combination and separation on 4 paths of signals of the TWDM-PON system to a single main fiber. Downlink wavelengths may also be based on the periodicity of the device, and the service sub-wavelength, the registration sub-wavelength and the downlink wavelengths are multiplexed and demultiplexed from the same port of AWG. It should be noted that the periodic AWG is used as an OLT side combiner-separator device, which is merely one of the embodiments. The combiner-separator may also be realized by using a Thin Film Filter (TFF). At this time, the definition of CH1-CH4 grid points in the service sub-wavelength band and the registration sub-wavelength band may no longer use the above definition mode, and may be specifically realized according to the combiner-separator.

Figure 9:
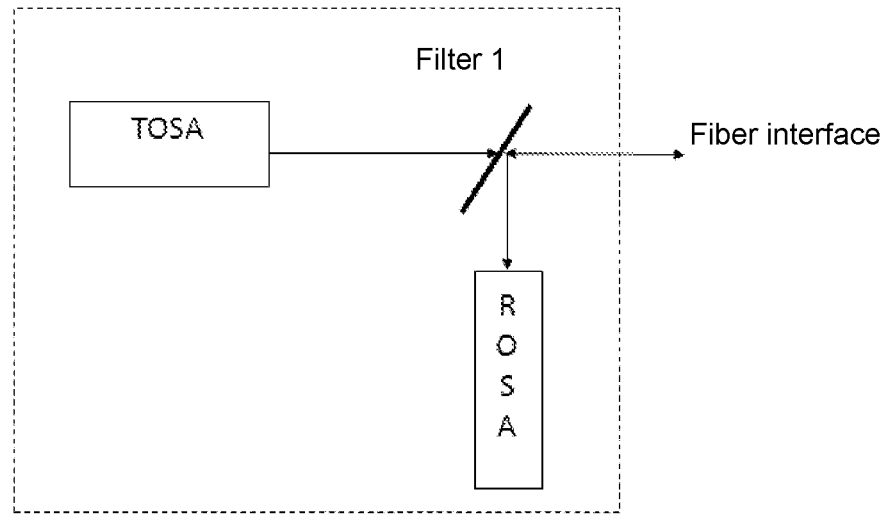
FIG. 9 is an optical path structure diagram of another ONU optical module according to an embodiment of the present disclosure.

FIG. 9 is an optical path structure diagram of another ONU optical module according to an embodiment of the present disclosure. As shown in FIG. 9, the optical module includes an optical transmission assembly (TOSA) for ONU normal communication and ONU registration, and an optical receiving assembly (ROSA) for normal receiving. The emitted light wavelength of TOSA may be tuned and switched between the service sub-wavelength band and the registration sub-wavelength band, may be realized based on devices such as an EML, a DML and a tunable laser, and has a tuning or switching capability of about 8 nm (service sub-wavelength band range+isolation sub-wavelength range), and TOSA further includes a temperature control device and a wavelength tuning or switching device, etc.

The ONU optical module further includes a filter 1 for wave combination and separation of TOSA and ROSA, so as to realize optical path single-fiber output of the optical module. If the service sub-wavelength and the registration sub-wavelength at the transmitting end of this module are still located in the TWDM-PON wavelength plan defined by G.989.2, the filter 1 may reuse the original combiner-separator device without redesign.

The ONU optical module further includes a control module which tunes or switches emitted light wavelengths of TOSA at different stages of the ONU registration process according to control instructions sent by the ONU device. The ONU optical module further includes modules such as a controller, a driver, a TIA, etc. a general electrical processing chip and a communication interface, so as to realize the normal working of the optical module and information interaction between the optical module and a device.

With the wavelength plan described in the present embodiment, the OLT optical device is connected to OLT optical modules CH1-CH4 and a main fiber using a periodic AWG device. Downlink wavelengths CH1-CH4 emitted by the OLT optical modules CH1-CH4 are multiplexed to the main fiber. Uplink registration sub-wavelengths CH1-CH4 or uplink service sub-wavelengths CH1-CH4 input by the main fiber are respectively demultiplexed to the corresponding OLT optical module for receiving.

Taking CH1 as an example, the OLT optical module includes an optical transmission assembly TOSA for normal communication, an optical receiving assembly 1 (ROSA1) for normal communication, and an optical receiving assembly 2 (ROSA2) for receiving a registration wavelength of the ONU. ROSA1 and ROSA2 may be implemented using devices such as an APD and a PIN. ROSA1 only receives a service sub-wavelength, and ROSA2 only receives a registration sub-wavelength.

Figure 10:
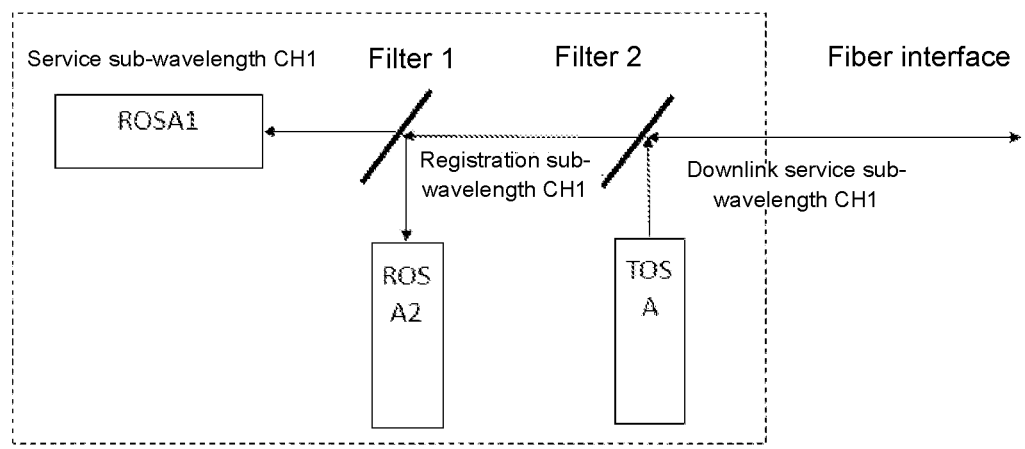
FIG. 10 is an optical path structure diagram of another OLT optical module according to an embodiment of the present disclosure.

FIG. 10 is an optical path structure diagram of another OLT optical module according to an embodiment of the present disclosure. As shown in FIG. 10, ROSA1 used for normal communication receives a service sub-wavelength band wavelength emitted by the ONU via a transmission end of the filter 1, and ROSA2 used for ONU registration receives a registration sub-wavelength band wavelength emitted by the ONU via a reflection end of the filter 1. The filter 1 of the OLT optical module satisfies the following conditions. The filter 1 has a low-loss transmission for the service sub-wavelength and a low-loss reflection for the registration sub-wavelength, and a transmission spectrum and a reflection spectrum thereof need to satisfy the condition of minimal crosstalk in the service sub-wavelength band and the registration sub-wavelength band.

The OLT optical module further includes a filter 2 for wave combination and separation of TOSA, ROSA1 and ROSA2, so as to realize optical path single-fiber output of the optical module. The filter 2 realizes low-loss wave combination and separation of the service sub-wavelength and the registration sub-wavelength received by the OLT and a working wavelength optical signal emitted thereby. If the service sub-wavelength and the registration sub-wavelength received by the OLT optical module are still located in the TWDM-PON wavelength plan defined by G.989.2, the filter 2 may reuse the combiner-separator device of TWDM PON without redesign.

The OLT optical module further includes a control module which opens or closes ROSA2 at different stages of the registration process according to control instructions sent by the OLT device. The OLT optical module further includes modules such as a controller, a driver, a TIA, etc. a general electrical processing chip and a communication interface, so as to realize the normal working of the optical module and information interaction between the optical module and a device.

The above sub-band division is only an embodiment of the present disclosure, and that the sub-band division range may actually be adjusted based on transmitter cost, filter isolation band size, and available wavelength resources.

In another aspect, an embodiment of the present disclosure also provides a storage medium. The storage medium stores a computer program. The computer program is configured to perform, when executed, the steps in any one of the above method embodiments.

In an embodiment, the above storage medium may be configured to store the computer program for performing the following steps. In step S1, an ONU responds to a ranging request message sent by an OLT on a first uplink wavelength supported by the ONU. In step S2, the ONU receives ranging information sent by the OLT. In step S3, the ONU uses the received ranging information as ranging information about a second uplink wavelength of the ONU, and performs data transmission on the second uplink wavelength according to a bandwidth allocation from the OLT. A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

Or, in step S1, an OLT sends a ranging request message to an ONU on a downlink wavelength, and receives a ranging response message on a first uplink wavelength supported by the ONU. In step S2, the OLT completes ranging of the downlink wavelength and the first uplink wavelength according to the ranging response message, and sends ranging information to the ONU on the downlink wavelength. The ranging information is used for instructing the ONU to switch a sending wavelength to a second uplink wavelength supported by the ONU. In step S3, the OLT performs data transmission with the ONU on the second uplink wavelength. A path transmission time difference caused by a wavelength interval between the first uplink wavelength and the second uplink wavelength is less than a corresponding fault tolerance range when the OLT receives data.

In the present embodiment, the storage medium may include, but is not limited to, various media capable of storing a computer program such as a U disk, a ROM, a RAM, a mobile hard disk, a magnetic disk or an optical disc.

An embodiment of the present disclosure also provides an electronic device, which includes a memory and a processor. The memory stores a computer program. The processor is configured to run the computer program to perform the steps in any one of the above method embodiments.

In an embodiment, the electronic device may further include a transmission device and an input/output device. The transmission device is connected to the above processor, and the input/output device is connected to the above processor.

In an embodiment, the above processor may be configured to perform the following steps through a computer program. In step S1, an ONU responds to a ranging request message sent by an OLT on a first uplink wavelength supported by the ONU. In step S2, the ONU receives ranging information sent by the OLT. In step S3, the ONU uses the received ranging information as ranging information about a second uplink wavelength of the ONU, and performs data transmission on the second uplink wavelength according to a bandwidth allocation from the OLT. A path transmission time difference caused by a wavelength interval between the first uplink wavelength and the second uplink wavelength is less than a corresponding fault tolerance range when the OLT receives data. The ranging information is obtained by the OLT according to a ranging response sent by the ONU on the first uplink wavelength.

Or, in step S1, an OLT sends a ranging request message to an ONU on a downlink wavelength, and receives a ranging response message on a first uplink wavelength supported by the ONU. In step S2, the OLT completes ranging of the downlink wavelength and the first uplink wavelength according to the ranging response message, and sends ranging information to the ONU on the downlink wavelength. The ranging information is used for instructing the ONU to switch a sending wavelength to a second uplink wavelength supported by the ONU. In step S3, the OLT performs data transmission with the ONU on the second uplink wavelength. A path transmission time difference caused by a wavelength interval between the first uplink wavelength and the second uplink wavelength is less than a corresponding fault tolerance range when the OLT receives data.

A specific example in the present embodiment may refer to the examples described in the above embodiments and optional implementation manners, and details are not described herein in the present embodiment.

With the present disclosure, a new wavelength capable of maintaining the low delay capacity of an original system is switched. Therefore, it is possible to solve the problem of difficulty in reducing the transmission delay of a service PON system with a high delay requirement in the related art, and the effect of expanding the transmission delay requirement of the service PON system is achieved.

It is apparent that those skilled in the art should understand that the above modules or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above descriptions are only the exemplary embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A wavelength switching method for a Passive Optical Network (PON), comprising:
responding, by an Optical Network Unit (ONU), to a ranging request message sent by an Optical Line Terminal (OLT) on a first uplink wavelength supported by the ONU;
receiving, by the ONU, ranging information sent by the OLT; and
using, by the ONU, the received ranging information as ranging information about a second uplink wavelength of the ONU, and tuning or switching, by the ONU, a sending wavelength from the first uplink wavelength to the second uplink wavelength, and performing data transmission on the second uplink wavelength according to a bandwidth allocation from the OLT,
when the ONU self-determines to save energy or receives recovery ranging information sent by the OLT, tuning or switching, by the ONU, a current sending wavelength from the second uplink wavelength to the first uplink wavelength, the recovery ranging information being used for instructing the ONU to configure the sending wavelength as the first uplink wavelength;
wherein a path transmission time difference caused by a wavelength interval between the first uplink wavelength and the second uplink wavelength is less than a corresponding fault tolerance range when the OLT receives data, and the ranging information is obtained by the OLT according to a ranging response sent by the ONU on the first uplink wavelength.

2. The method according to claim 1, wherein the ranging information comprises at least one of the following: an equivalent delay, or a difference between an equivalent delay and a line transmission delay.

3. An electronic device, comprising a memory and a processor, wherein the memory stores a computer program, and the processor is configured to execute the computer program to perform the method according to claim 2.

4. The method according to claim 1, wherein the second uplink wavelength is used for bearing a service having a delay smaller than a preset delay threshold.

5. An electronic device, comprising a memory and a processor, wherein the memory stores a computer program, and the processor is configured to execute the computer program to perform the method according to claim 4.

6. The method according to claim 1, wherein the fault tolerance range is related to an uplink transmission rate between the ONU and the OLT.

7. An electronic device, comprising a memory and a processor, wherein the memory stores a computer program, and the processor is configured to execute the computer program to perform the method according to claim 6.

8. A non-transitory storage medium, storing a computer program thereon, wherein the computer program is configured to perform, when executed, the method according to claim 1.

9. An electronic device, comprising a memory and a processor, wherein the memory stores a computer program, and the processor is configured to execute the computer program to perform the method according to claim 1.

10. A wavelength configuration method for a Passive Optical Network (PON), comprising:
sending, by an Optical Line Terminal (OLT), a ranging request message to an Optical Network Unit (ONU) on a downlink wavelength, and receiving a ranging response message on a first uplink wavelength supported by the ONU;
completing, by the OLT, ranging of the downlink wavelength and the first uplink wavelength according to the ranging response message, and sending ranging information to the ONU on the downlink wavelength, the ranging information being used for instructing the ONU to switch a sending wavelength to a second uplink wavelength supported by the ONU; and
after the ONU tuning or switching a sending wavelength from the first uplink wavelength to the second uplink wavelength, performing, by the OLT, data transmission with the ONU on the second uplink wavelength,
when the ONU self-determines to save energy or receives recovery ranging information sent by the OLT, tuning or switching, by the ONU, a current sending wavelength from the second uplink wavelength to the first uplink wavelength, the recovery ranging information being used for instructing the ONU to configure the sending wavelength as the first uplink wavelength;

wherein a path transmission time difference caused by a wavelength interval between the first uplink wavelength and the second uplink wavelength is less than a corresponding fault tolerance range when the OLT receives data.

11. The method according to claim 10, wherein the ranging information comprises at least one of the following: an equivalent delay, or a difference between an equivalent delay and a line transmission delay.

12. An electronic device, comprising a memory and a processor, wherein the memory stores a computer program, and the processor is configured to execute the computer program to perform the method according to claim 11.

13. The method according to claim 10, wherein the second uplink wavelength is used for bearing a service having a delay smaller than a preset delay threshold.

14. The method according to claim 10, wherein the fault tolerance range is related to an uplink transmission rate between the ONU and the OLT.

15. An electronic device, comprising a memory and a processor, wherein the memory stores a computer program, and the processor is configured to execute the computer program to perform the method according to claim 10.

16. A wavelength switching device for a Passive Optical Network (PON), located on an Optical Network Unit (ONU), and comprising:

a response module, configured to respond to a ranging request message sent by an Optical Line Terminal (OLT) on a first uplink wavelength supported by the ONU;

a receiving module, configured to receive ranging information sent by the OLT; and a switching module, configured to use the received ranging information as ranging information about a second uplink wavelength of the ONU, and tune or switch the sending wavelength from the first uplink wavelength to the second uplink wavelength, and perform data transmission on the second uplink wavelength according to a bandwidth allocation from the OLT, the switching module is further configured to, when the ONU self-determines to save energy or receives recovery ranging information sent by the OLT, tune or switch a current sending wavelength from the second uplink wavelength to the first uplink wavelength, the recovery ranging information being used for instructing the ONU to configure the sending wavelength as the first uplink wavelength;

wherein a path transmission time difference caused by a wavelength interval between the first uplink wavelength and the second uplink wavelength is less than a corresponding fault tolerance range when the OLT receives data, and the ranging information is obtained by the OLT according to a ranging response sent by the ONU on the first uplink wavelength.

* * * * *